US009254925B2

(12) United States Patent
Garcia Nevado et al.

(10) Patent No.: US 9,254,925 B2

(45) Date of Patent: Feb. 9, 2016

(54) AIR INTAKE WITH DOUBLE INLET DOOR

(71) Applicant: AIRBUS OPERATIONS, S.L., Getafe (ES)

(72) Inventors: Javier Garcia Nevado, Madrid (ES); Ivan Garcia Lopez, Rivas-Vaciamadrid (ES); Octavio Hernandez Gonzalez, Madrid (ES)

(73) Assignee: AIRBUS OPERATIONS, S.L., Getafe (ES)

( * ) Notice: Subject to any disclaimer, the term of this patent is extended or adjusted under 35 U.S.C. 154(b) by 688 days.

(21) Appl. No.: 13/628,293

(22) Filed: Sep. 27, 2012

(65) Prior Publication Data

US 2013/0081706 A1 Apr. 4, 2013

(30) Foreign Application Priority Data

Sep. 29, 2011 (ES) .................................. 201131571

(51) Int. Cl.

*B64D 41/00* (2006.01)
*F02C 7/04* (2006.01)
*B64D 33/02* (2006.01)

(52) U.S. Cl.

CPC ........ *B64D 41/00* (2013.01); *B64D 2033/0213* (2013.01); *Y10T 137/0536* (2015.04)

(58) Field of Classification Search

CPC ................... B64D 2033/0213; B64D 2241/00; B64D 33/02; B64D 2041/002; B64D 41/00; F02C 7/042; F02C 7/04; F02C 7/057

USPC ................................................ 244/53 B, 58

See application file for complete search history.

(56) References Cited

U.S. PATENT DOCUMENTS 3,099,423 A * 7/1963 Wilde et al. ................ 244/23 R
4,203,566 A * 5/1980 Lord .............................. 244/57
4,474,344 A * 10/1984 Bennett ...................... 244/53 B
4,854,463 A * 8/1989 Cyr .............................. 220/481
6,264,137 B1 * 7/2001 Sheoran ...................... 244/53 B
6,349,899 B1 * 2/2002 Ralston ....................... 244/53 B
7,198,062 B2 * 4/2007 Hoffman et al. ......... 137/601.09
7,232,097 B2 * 6/2007 Noiseux et al. .............. 244/121
7,461,814 B2 * 12/2008 Hein et al. ................. 244/53 B
7,690,598 B1 * 4/2010 Plattner ..................... 244/129.1
8,256,311 B2 * 9/2012 Payne et al. ................. 74/89.37
8,721,406 B2 * 5/2014 Kastell et al. .................. 454/76

* cited by examiner

*Primary Examiner* — William H Rodriguez
*Assistant Examiner* — Jason H Duger
(74) *Attorney, Agent, or Firm* — Oblon, McClelland, Maier & Neustadt, L.L.P.

(57) ABSTRACT

An APU air intake having a foldable intake door, including a frame with airfoil profiles. The frame is turned to an aperture angle ($\alpha$) with respect to the frame support, and each airfoil profile is turned to a profile angle ($\beta_i$) with respect to the frame. The aperture angle ($\alpha$) varies from 0° to 22°, and the profile angles ($\beta_i$) vary from 0° to 110°. The frame is moved by an actuator and the airfoil profiles are operated by extendable rods and secondary rods each secondary rod having rod supports. A latching mechanism is assembled onto each extendable rod, including a rare earth magnet and either a magnet contact plate or a plate with another magnet.

3 Claims, 10 Drawing Sheets

X-X

G
102
G
103b
$\beta_2$
120
119b
G
102
121
$\alpha$
118
G
103a
$\beta_1$
117
115
114
113
119a
109a
112
120
110
109b
G
122
111a
110
110

AIR INTAKE WITH DOUBLE INLET DOOR

OBJECT OF THE INVENTION

The present invention discloses an air intake retractable flap suitable for the auxiliary power unit (APU) of an aircraft, having a frame and profiles. The invention has application within the aeronautic industry.

PRIOR STATE OF THE ART AND PROBLEM TO BE SOLVED

The auxiliary power unit (APU) of an aircraft is usually designed to work on ground conditions during 99% of its operative time. Notwithstanding, it can be an essential system that should be capable of being operative in flight conditions. It is an object of the present invention to achieve an optimum performance of the air intake during the flight of an aircraft, at the same time as its on ground performance is improved.

The state of the art shows two main APU air intake types: “flush intakes” and “ram intakes”. Flush intake types have air intake door opening inward the aircraft. Ram intake types have air intake door opening outward the aircraft.

Referring to flush intake types, they have an optimum on ground performance, but this performance is partially impaired because they also have a low ramp entrance angle. Unfortunately, even using a low aperture angle, an adequate improvement of the dynamic pressure is not always attained; this situation increases the aerodynamic drag.

Considering ram intake types, they have better in flight performance and provide nearly zero drag in the closed position. Regrettably, ram intake types present on ground drawbacks, because of the aperture angle must be low, around 20° unless a more complex variable aperture system is used. Conversely, suitable angle for the on ground operation, which is around 50°, would generate a very high aerodynamic drag, having a negative impact in both the robustness of the actuator and the overall weight.

Hence, it is desirable to achieve an APU air intake design with optimum performance both when on ground and while in flight configurations, keeping the reliability standards required by air navigation regulations. Therefore, the aim of the invention is to achieve a new APU air intake design, suitable to obtain the best performances at both in flight and on ground configurations, avoiding the previous mentioned drawbacks.

APU air intakes are widely known in the state of the art; the document U.S. 2009/0065297 A1 reveals a dual action inlet door for reducing noise from an APU. Still, the invention disclosed in this document improves the state of the art, optimizing both on ground and in flight APU performance.

DESCRIPTION OF THE INVENTION

In order to achieve the objectives and to solve the aforementioned drawbacks, the invention develops a foldable double door comprising a frame, a frame support and two airfoil profiles, having a front airfoil profile and a rear airfoil profile. The frame opens an aperture angle ($\alpha$) with respect to the frame support, and each air profile is turned a profile angle ($\beta_i$) with respect to the frame.

The airfoil profiles have a rectangular planform shape, and the airfoil profiles are fitted into the frame.

The frame aperture angle ($\alpha$) varies from 0° to 22°, the front profile angle ($\beta_1$) varies from 0° to 80°, and the rear profile angle ($\beta_2$) varies from 0° to 110°.

The frame is moved by an actuator, and the airfoil profiles are operated by extendable rods and fixed length rods, each fixed length rod having supports.

The actuator, having supports, comprises a base element and a moving element, the moving element sliding telescopically in and out the base element. Each extendable rod, having a support and a head, comprises a first rod-shaped element and a second rod-shaped element, the second rod-shaped element sliding telescopically in and out the first rod-shaped element. Moreover, a latching mechanism is assembled onto each extendable rod.

The latching mechanism comprises a rare earth magnet, a magnet contact plate, a spring, a spring retainer, and a plate. The rare earth magnet is assembled onto the first rod-shaped element of the extendable rod. The magnet contact plate, the spring, the spring retainer and the plate are assembled onto the second rod-shaped element of the extendable rod.

The air intake foldable double door comprises a two positions actuator, allowing three operational modes selected among:

a) mode with the air intake double door closed, where the actuator is in the closed position, the frame is also closed, and the airfoil profiles are closed as well;
b) mode with the air intake double door open when on ground, where the actuator is in the open position, the frame is open, and the airfoil profiles are also open;
c) mode with the air intake double door open while in flight, where the actuator is in the open position, the frame is open, and the airfoil profiles are closed due to the air flow pressure.

BRIEF DESCRIPTION OF THE FIGURES

The present invention will be completely understood on the basis of the description and the drawings hereinafter presented which are shown as preferred embodiment and therefore are not restrictive.

Figure 1:
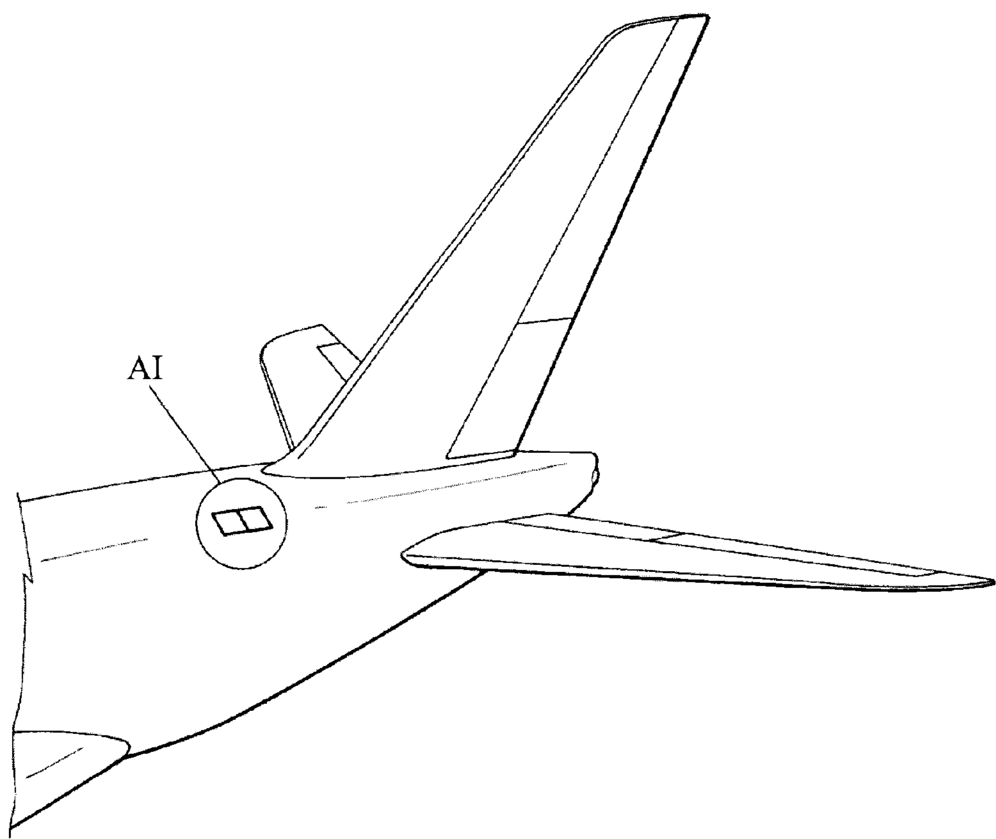
FIG. 1 shows a general view of an APU air intake, at the aircraft tail cone portion.

A list of reference designations used in the drawings is given next:

101=foldable double door;
102=frame;
103=airfoil profiles;
103*a*=front airfoil profile;
103*b*=rear airfoil profile;
104=pinned joint;
105=pinned joint;
108=inlet holes;
109=actuator;

109*a*=actuator base element;
109*b*=actuator moving element;
110=supports;
111=extendable rod;
111*a*=extendable rod first rod-shaped element;
111*b*=extendable rod second rod-shaped element;
112=rare earth magnet;
113=magnet contact plate;
114=short compression spring;
115=spring retainer;
116=plate;
117=extendable rod head;
118=fixed length rod;
119*a*=fixed length rod support;
119*b*=fixed length rod support;
120=airfoil profile supports;
121=cut-out frame;
122=stopper.

Other references:
A, B, C, G, H=air flow lines;
AI=APU air intake;
$\alpha$=frame aperture angle;
$\beta_1$=front profile aperture angle;
$\beta_2$=rear profile aperture angle.

DESCRIPTION OF THE PREFERRED EMBODIMENT

A description of the invention based on the aforementioned figures is presented hereinafter. FIG. 1 shows a general view of an APU air intake (AI) at an aircraft tail cone portion.

Figure 2A:
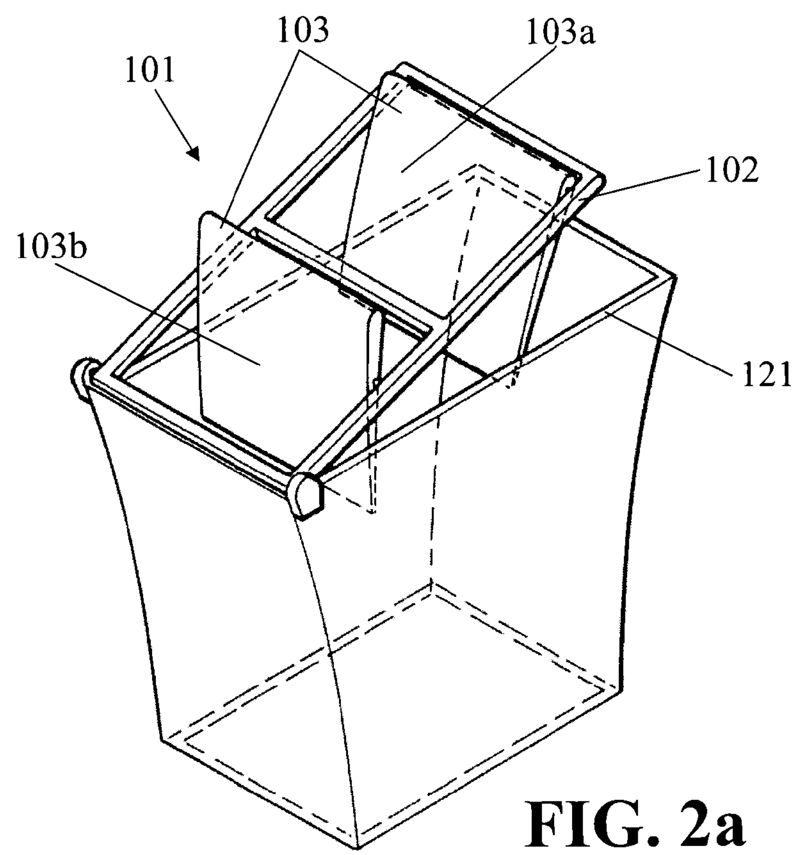
FIGS. 2*a*, 2*b* show the APU air intake at on ground open configuration.
Figure 2B:
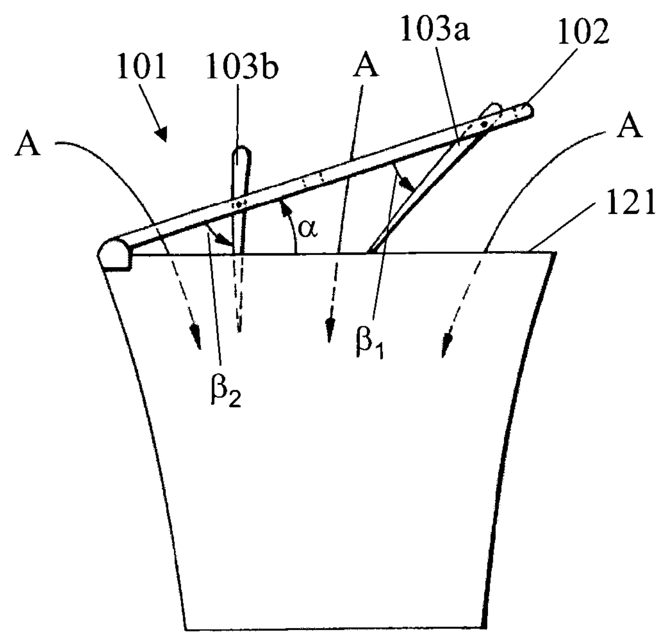

As it is shown in FIGS. 2*a* and 2*b*, the air intake foldable double door (101) of this invention comprises two airfoil profiles (103) placed over a frame (102). Each airfoil profile (103) has a rectangular planform shape, having the appropriate dimensions that allow the airfoil profile (103) to fit perfectly into the air intake holes (108) (see FIG. 7). Each airfoil profile (103) must also fit into the frame (102) in which it is located.

FIGS. 2*a* and 2*b* show the air intake foldable double door (101) at on ground configuration, having the frame (102) an aperture angle ($\alpha$) and each airfoil profile (103) a profile angle ($\beta_1$, $\beta_2$). The frame (102) is based on a cut-out frame (121). The frame (102) can be tilted with respect to the cut-out frame (121), according to the frame aperture angle ($\alpha$) (see FIG. 2*b*). Similarly, each airfoil profile (103) can rotate an angle ($\beta_1$, $\beta_2$) with respect to the frame (102), according to their kinematic linkages. Flow lines (A) represent the way in that the air enters through the air intake foldable double door (101).

Figure 3A:
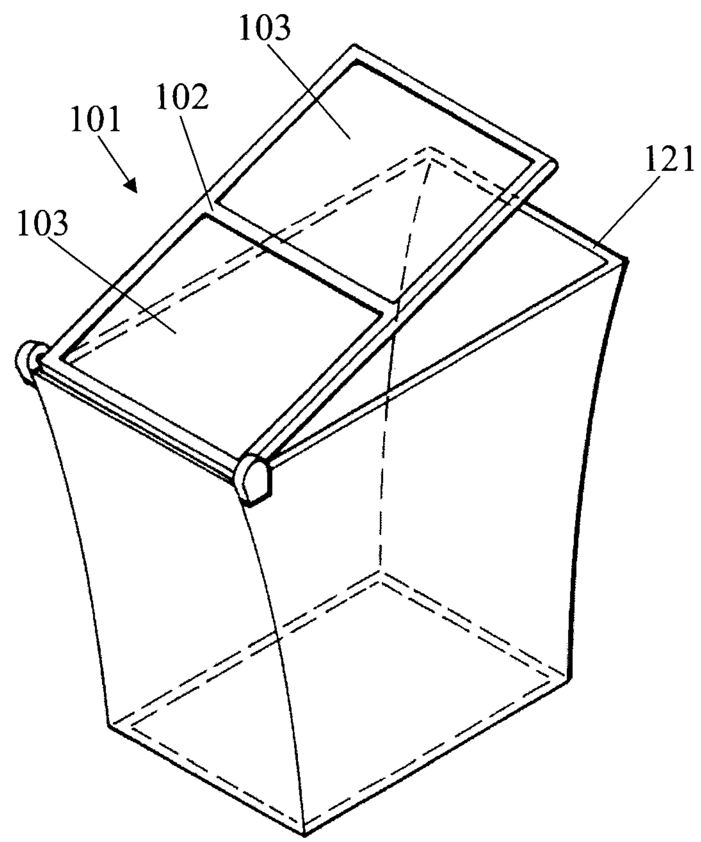
FIGS. 3*a*, 3*b* show the APU air intake at in flight open configuration.
Figure 3B:
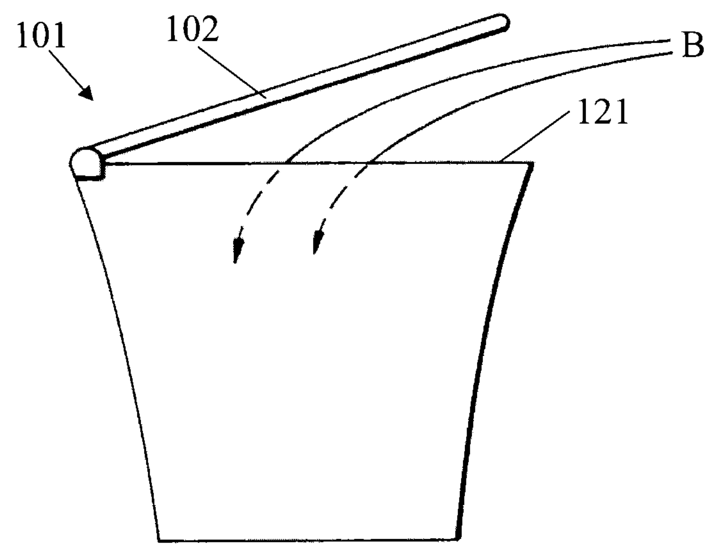

FIGS. 3*a* and 3*b* show the air intake foldable double door (101) at in flight configuration. The frame (102) has an aperture angle ($\alpha$) but the airfoil profiles (103) are closed, having their profile aperture angles ($\beta_1$, $\beta_2$) values equal to zero. Flow lines (B) represent the way in that the air enters through the air intake.

Figure 4A:
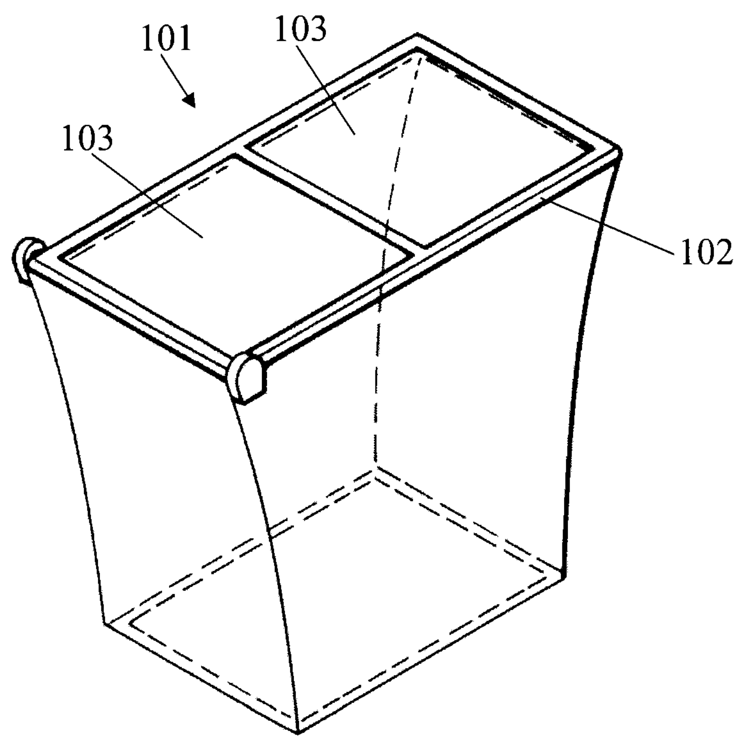
FIGS. 4*a*, 4*b* represent the APU air intake in closed operation mode.
Figure 4B:
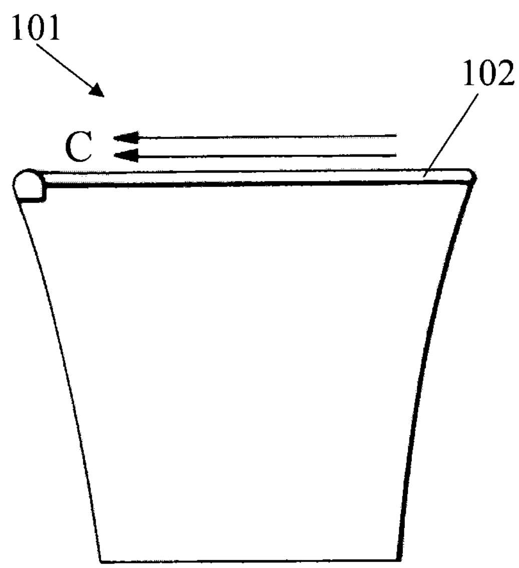

FIGS. 4*a* and 4*b* represent the air intake foldable double door (101) at closed position, when the APU is not operating. The frame aperture angle ($\alpha$) is equal to zero; in the same way, the airfoil profile aperture angles ($\beta_1$, $\beta_2$) are equal to zero as well. As it can be seen in FIG. 4*b*, the path followed by the air when passing through this area has been represented with flow lines (C). This configuration illustrates why this invention does not affect the aerodynamic drag when the air intake foldable double door (101) is at the closed position.

Figure 5:
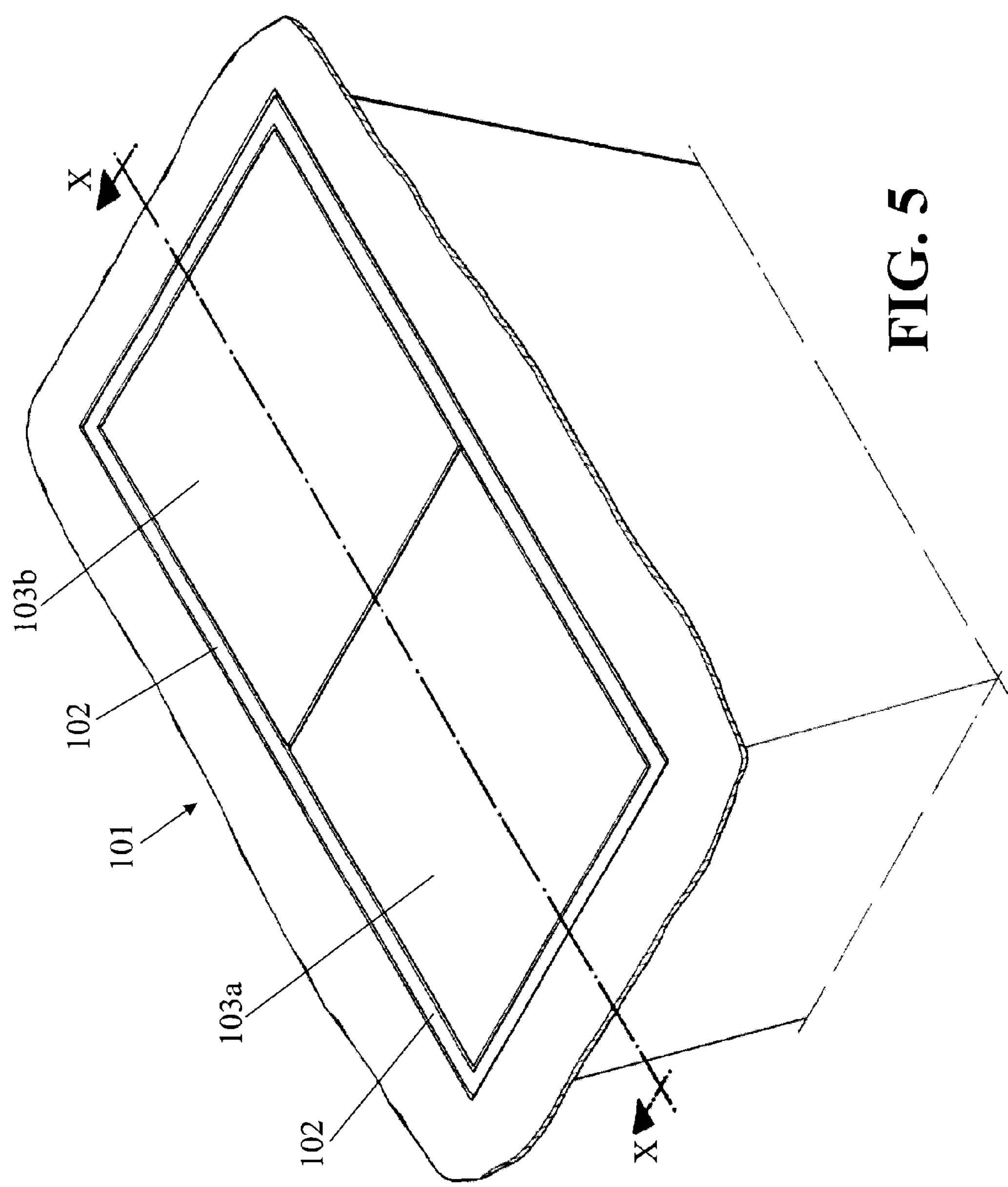
FIG. 5 shows a top view of the APU air intake.

FIG. 5 shows a general view of the air intake foldable double door (101) in closed position, having a frame (102). There are two airfoil profiles (103) placed at the frame (102). Each airfoil profile (103*a*, 103*b*) has a rectangular planform shape. These airfoil profiles (103*a*, 103*b*) can be defined as front airfoil profile (103*a*) and rear airfoil profile (103*b*).

Figure 6:
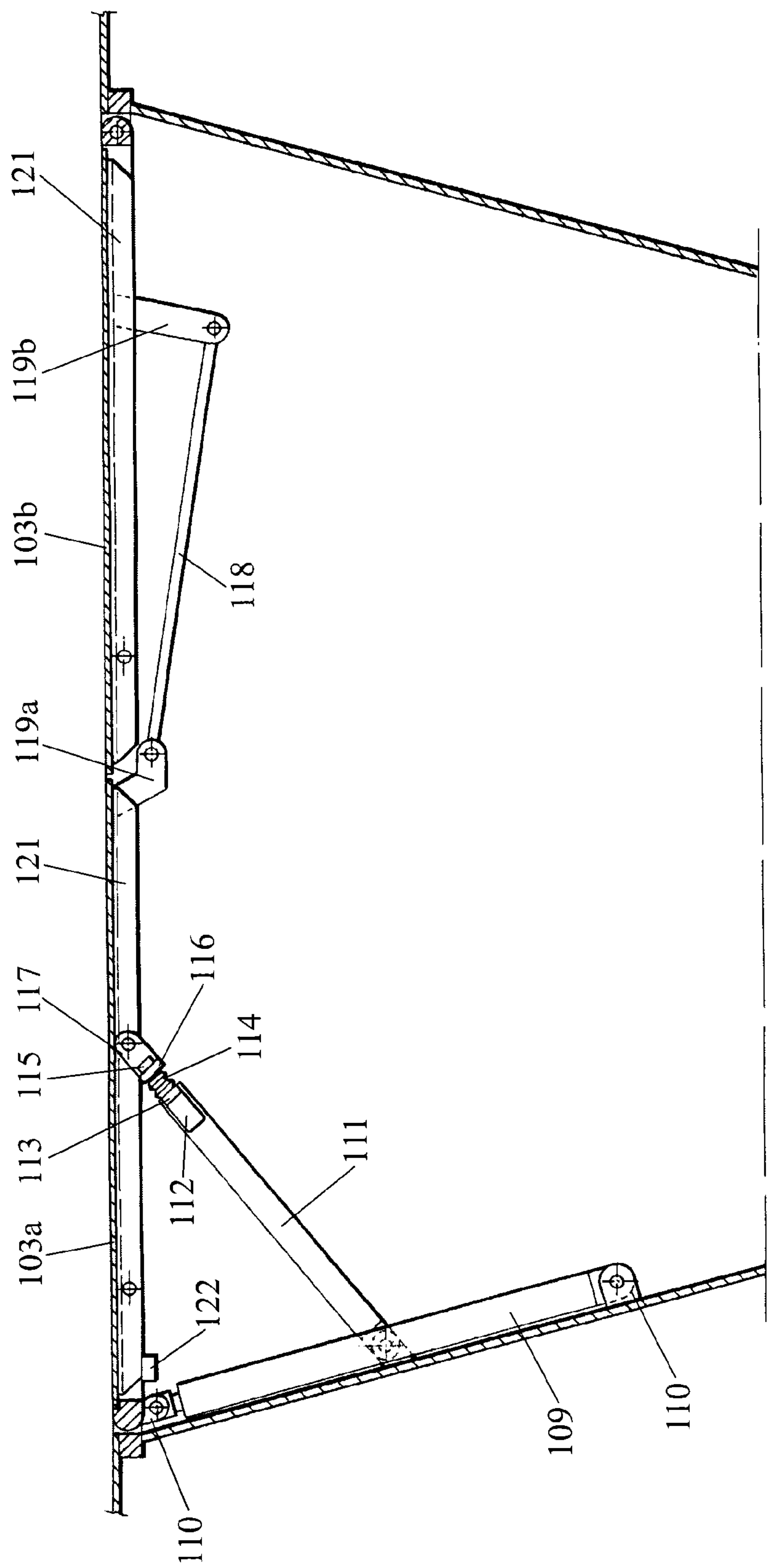
FIG. 6 is a cross section of FIG. 5 according to line XX.

FIG. 6 is a cross section of FIG. 5 according to line XX. There is an actuator (109), with its supports (110), for opening the APU air intake. Extendable rods (111) collaborate for opening and closing the airfoil profiles (103*a*, 103*b*) together with fixed length rods (118), each fixed length rod (118) having supports (119*a*, 119*b*). These supports (119*a*, 119*b*) are rigidly attached to the airfoil profiles (103*a*, 103*b*). The cut-out frame (121) is also used to hold and to retain in position the frame (102). A better understanding of the mechanism can be achieved with the help of FIG. 7.

Figures 7, 7A:
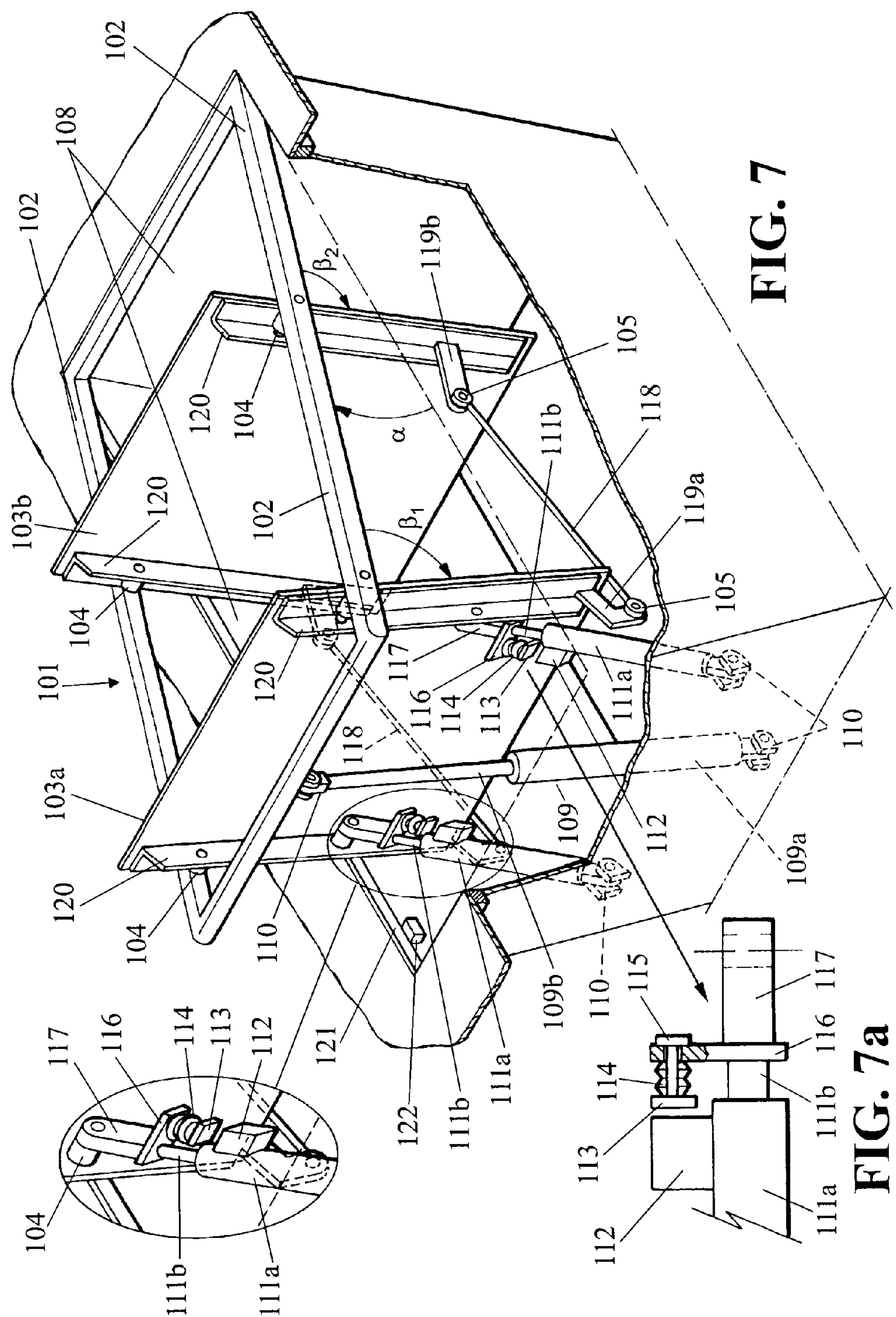
FIG. 7 is general overview of the APU air intake on ground open configuration.
FIG. 7*a* is a detail of the latching mechanism shown in FIG. 7.

FIG. 7 shows the general view of the APU air intake at on ground configuration. When opening is required, the actuator (109) opens the APU air intake. The actuator (109) comprises a base element (109*a*) and a moving element (109*b*), each of them having a support (110). The moving element (109*b*) slides telescopically out of the base element (109*a*) when opening. The moving element (109*b*) is connected to the frame (102) through the support (110); therefore the frame (102) begins to move when the moving element (109*b*) starts to slide. The frame (102) can be moved until it reaches a configuration around its original position (closed, considering FIG. 6) according to a frame aperture angle ($\alpha$). So the actuator (109) movement generates an angular displacement of the frame (102), according to the frame aperture angle ($\alpha$). The aperture angle ($\alpha$) must be measured from the cut-out frame (121) line to the frame (102) final position when it is open, as shown in FIG. 7. Experience has demonstrated that optimized values for aperture angle ($\alpha$) are around 22°.

The airfoil profiles (103*a*, 103*b*) are connected to the frame (102) using airfoil profile supports (120); these supports (120) are linked to the frame (102) through a couple of pinned joints (104). The airfoil profiles (103*a*, 103*b*) are turned using these pins (104) which work like rotation axis. Each extendable rod (111) comprises a first rod-shaped element (111*a*) and a second rod-shaped element (111*b*); the first rod-shaped element (111*a*) is linked to the support (110) through a pinned joint, and the second rod-shaped element (111*b*) connects to the corresponding airfoil profile support (120) through a pinned joint in the extendable rod head (117).

On ground, the extendable rods (111) remain in collapsed mode, operating like fixed length rod. So the movement of the frame (102) provokes, when opening, the rotation of the profile (103*a*) until its angle ($\beta_1$); and this rotation, because of the kinematic linkage between both profiles (103*a*, 103*b*) through the fixed length rods (118), provokes the rotation of the profile (103*b*) until its angle ($\beta_2$). Due to this configuration, air can flow into the APU air intake through the inlet holes (108).

FIG. 7*a* shows a detailed view of an extendable rod (111) having a latching mechanism. This latching mechanism comprises in this preferred embodiment an assembly having a rare earth magnet (112), a contact plate (113), a short compression spring (114), a spring retainer (115), and a plate (116). The rare earth magnet (112), like a samarium-cobalt type magnet, is placed on the top of the first rod-shaped element (111*a*) of the extendable rod (111). The magnet (112) actuates together with the contact plate (113), which is connected to the spring (114). The contact plate (113) is a plate either of a ferromagnetic material or it might contain another magnet assembled with the polarity opposed to that of the main magnet. The short compression spring (114) has its retainer (115), and the plate (116) is firmly fixed at the end of the second rod-shaped element (111*b*). The second rod-shaped element (111*b*) ends as a head part (117) which connects to the airfoil profile support (120) through a pinned joint (104). The short compression spring (114) assures the contact between the magnet assembly (112) and the contact plate (113), compensating the inaccuracies in the kinematic chain.

Figure 8:
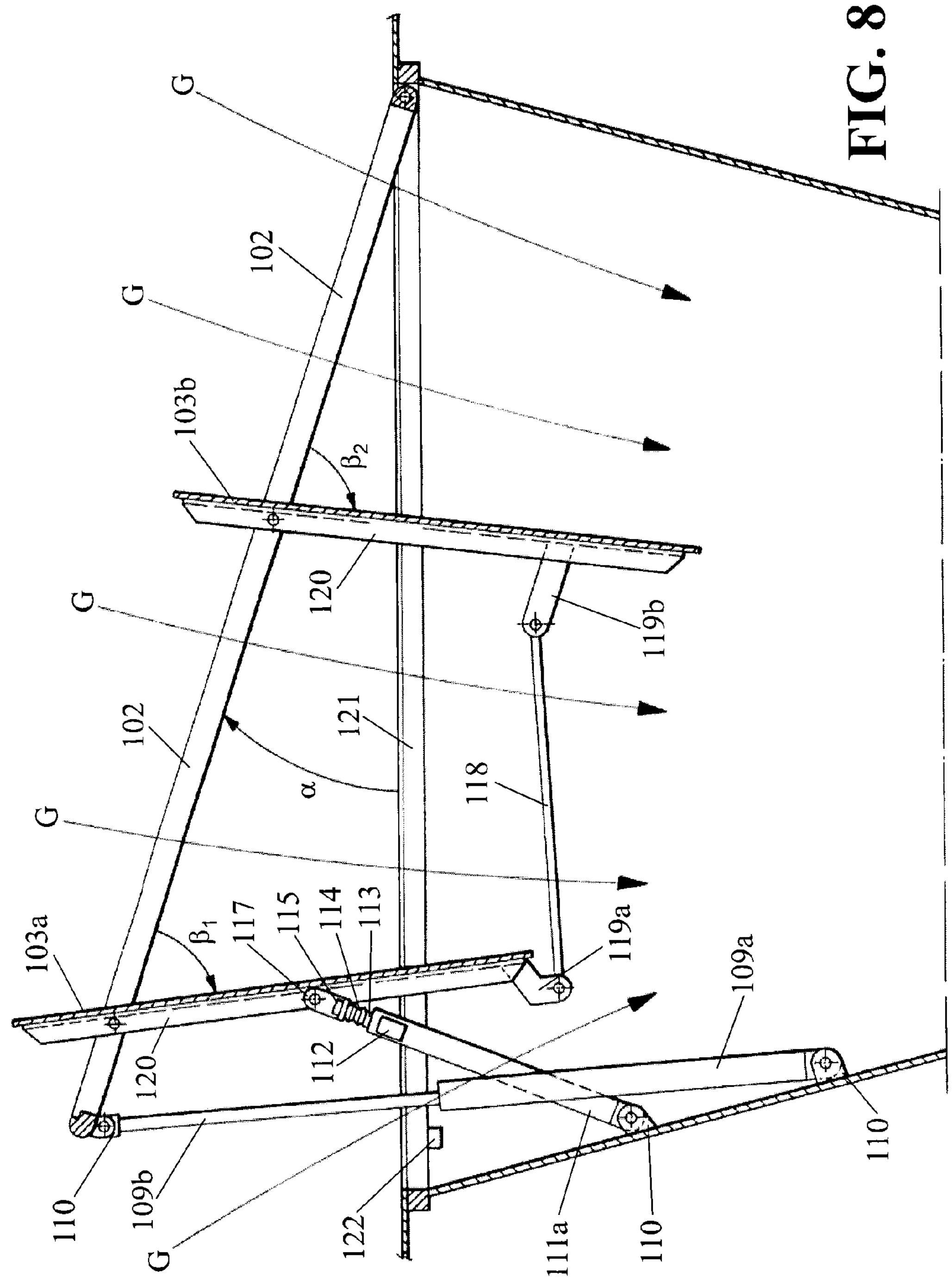
FIG. 8 shows a cross section of the APU air intake at on ground open configuration.

FIG. 8 shows a cross section of the invention at on ground operation configuration; air flow lines (G) are also shown. In this configuration the actuator (109) is extended, but the extendable rods (111) remain in their retracted configuration due to the action of the magnet (112) that retains firmly the magnet plate (113). The front airfoil profile (103*a*) forms a front profile aperture angle ($\beta_1$) with respect to the frame (102). Due to the existence of fixed length rods (118) between the front airfoil profile (103*a*) and the rear airfoil profile (103*b*), the rear airfoil profile (103*b*) starts moving when the front airfoil profile (103*a*) begins to turn. The rear airfoil profile (103*b*) forms a rear profile aperture angle ($\beta_2$) with respect to the frame (102). Relationship between the front profile aperture angle ($\beta_1$) and the rear profile aperture angle ($\beta_2$) depends on the length of fixed length rods (118) and the supports (119*a*, 119*b*). Each fixed length rod (118) is linked to its supports (119*a*, 119*b*) using pinned joints (105). Experience has demonstrated that values for profile aperture angles ($\beta_1$, $\beta_2$) reach up to about 110°; more in detail, $\beta_1$ optimized angle values varies between 0° and 80°, and $\beta_2$ optimized angle values varies between 0° and 110°.

Figure 9:
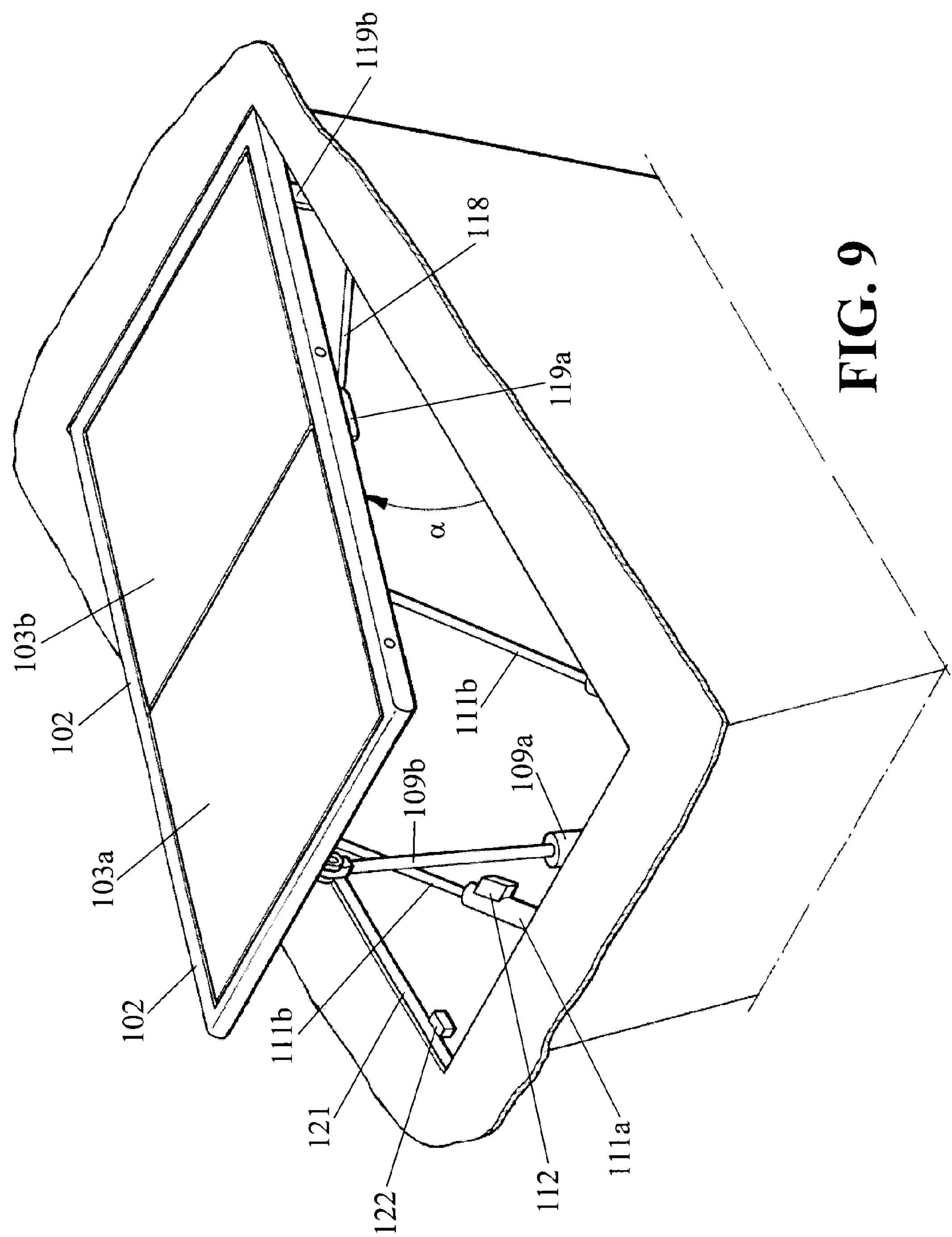
FIG. 9 is a view of the APU air intake at in flight open configuration.

FIG. 9 is a view of the invention at in flight operation configuration wherein, according to measured experiences, the aperture angle ($\alpha$) can reach an optimized value up to about 22°, in order to maintain aerodynamic drag under reasonable values. However, airfoil profiles (103*a*, 103*b*) are kept aligned with the frame (102), i.e., front and rear profile angles are $\beta_1=\beta_2=0°$. This configuration implies that the actuator (109) and the extendable rods (111) are fully extended.

Figure 10:
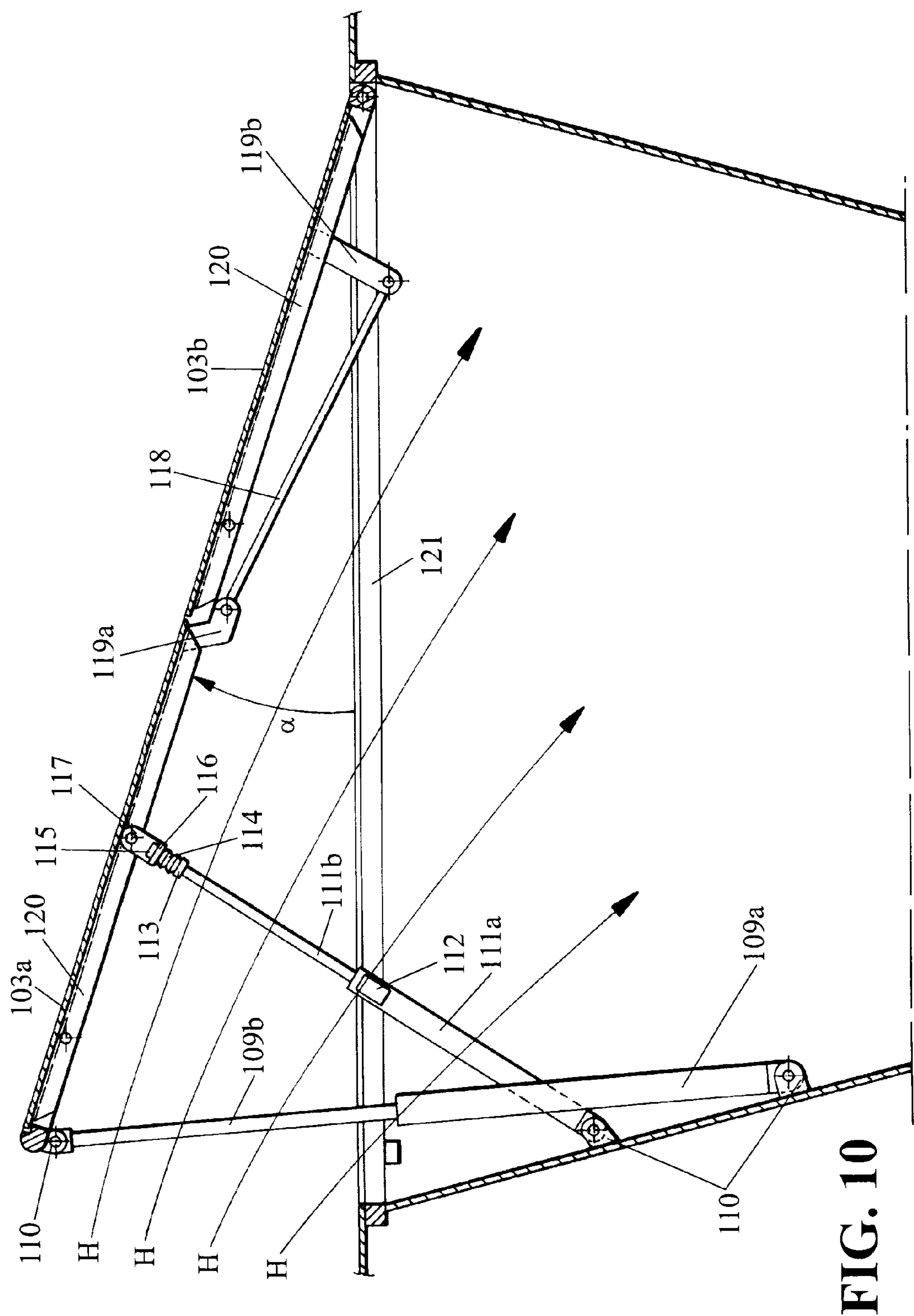
FIG. 10 shows a cross section of the APU air intake at in flight open configuration.

FIG. 10 shows a cross section of the invention at in flight operation configuration, showing air flow lines (H) when the air is flowing into the air intake. Due to the aerodynamic drag force against the airfoil profiles (103*a*, 103*b*) when APU on ground configuration is deployed (FIG. 8) at in flight conditions, the retention force between the magnet (112) and the magnet plate (113) is overcome; hence, the second rod-shaped element (111*b*) slides telescopically out of the first rod-shaped element (111*a*), and the airfoil profiles (103*a*, 103*b*) begin to turn adopting the in flight configuration (FIG. 10).

Therefore, the air intake foldable double door (101) on ground operation is the following: when the opening position is required, as it can be seen at FIG. 6, the actuator (109) opens the APU air intake at on ground configuration (FIGS. 7, 8). The moving element (109*b*) moves out of the base element (109*a*) and the frame (102) begins to turn according to the frame aperture angle ($\alpha$) pattern (see FIG. 8). Due to the magnetic force provided from the magnet (112), the magnet contact plate (113) is kept together by the magnet (112), and the airfoil profiles (103*a*, 103*b*) also begin to turn around the frame (102), until the airfoil profiles (103*a*, 103*b*) reach their profile aperture angle ($\beta_1$, $\beta_2$ respectively). Thus on ground configuration has been adopted (FIGS. 7, 8).

The in flight configuration (FIGS. 9, 10) is achieved due to the torque generated by the aerodynamic pressure against the airfoil profiles (103*a*, 103*b*) when the air intake is totally or partially open. Once initiated the movement, air flow impacts onto airfoil profiles (103*a*, 103*b*) and the aerodynamic load overpass the retaining force of the magnet (112). The magnet contact plate (113) moves away from the magnet (112) and the second rod-shaped element (111*b*) starts to slide telescopically out of the first rod-shaped element (111*a*), until the airfoil profiles (103*a*, 103*b*) are aligned with the frame (102), i.e. $\beta_1=\beta_2=0$ (FIG. 10).

Both intake configurations (on ground/in flight) can easily be reverted and the air intake foldable double door (101) can be closed through the actuator. Therefore (FIG. 10), the actuator (109) moving element (109*b*) begins to slide into the actuator (109) base element (109*a*). Moreover, the extendable rod (111) second rod-shaped element (111*b*) starts to move telescopically into the extendable (111) rod first rod-shaped element (111*a*) until the initial configuration is reached (FIG. 6).

The APU air intake opening and closing is provided by an actuator. The different types of actuator are well known in the state of the art. When a variable displacement actuator is used, for instance a three position actuator, it is possible to achieve a higher door opening angle when on ground operations are required. At this configuration, a lower in flight flap opening angle is also available. Those actuators are more complex and heavy, presenting a lower reliability since they have an additional signal sensor, a more sophisticated control and they do present more malfunction modes.

The air intake foldable double door (101) disclosed in this document can use a two positions actuator whereby the following three operational modes are attained:

1) Mode with the air intake foldable double door (101) closed (FIG. 6): wherein the actuator is in the closed position, the frame (102) is also closed, and the airfoil profiles (103*a*, 103*b*) are closed as well. In this mode, the design of the air intake proposed by the present invention does not affect the aerodynamic performance of the aircraft.
2) Mode with the air intake foldable double door (101) open when on ground (FIG. 8): wherein the actuator is in the open position, the frame (102) is open, and the airfoil profiles (103*a*, 103*b*) are also open. The airfoil profiles (103*a*, 103*b*) work as guide vanes, allowing the air flow (G) to access through these airfoil profiles (103*a*, 103*b*) towards the passages.
3) Mode with the air intake foldable double door (101) open while in flight (FIG. 10): wherein the actuator is in the open position, the frame (102) is open, and the airfoil profiles (103*a*, 103*b*) are aligned with the frame (102) due to the air flow pressure, such that they form a classic "ram intake" type.

It should be appreciated that the mentioned embodiment is only an example, and it does not intend to limit the applicability, configuration or scope of the invention in any way. It is understood that some changes may be made in the functionality and arrangement of the elements described in the exemplary embodiment. The foregoing detailed description will provide those skilled in the art references for implementing an exemplary embodiment of the invention, without departing from the scope of the invention as set forth in the appended claims.

The invention claimed is:

1. An auxiliary power unit comprising:

an air intake foldable double door comprising:

a frame;

a frame support;

two airfoil profiles that consist of a front airfoil profile and a rear airfoil profile;

wherein the frame forms an aperture angle ($\alpha$) with respect to the frame support, wherein the aperture angle ($\alpha$) is within a range of 0° to 22°, wherein the front airfoil profile forms a front profile angle ($\beta_1$) with respect to the frame, wherein the front profile angle is within a range of 0° to 80°, wherein the rear airfoil profile forms a rear profile angle ($\beta_2$) with respect to the frame, wherein the rear profile angle is within a range of 0° to 110°, wherein the frame is movable by an actuator, and the front airfoil profile and the rear airfoil profile are operable by extendable rods and fixed length rods, each fixed length rod having supports, wherein:

the actuator having actuator supports, said actuator comprising a first base element and a second element, the second element being telescopically movable within the first base element;

each extendable rod having an extendable rod support and an extendable rod head, said each extendable rod comprising a first rod-shaped element and a second rod-shaped element, the second rod-shaped element being telescopically movable within the first rod-shaped element;

wherein a latching mechanism is assembled onto each extendable rod, and wherein the latching mechanism comprises:

a rare earth magnet;

a magnet contact plate;

a spring;

a spring retainer;

a plate, where the rare earth magnet is assembled onto the first rod-shaped element of the extendable rod; and the magnet contact plate, the spring, the spring retainer and the plate are assembled onto the second rod-shaped element of the extendable rod, wherein the air intake foldable double door is mounted in fluid communication with the auxiliary power unit for controlling an amount of air entering the auxiliary power unit.

2. An auxiliary power unit according to claim 1, wherein the two airfoil profiles have a rectangular planform shape, where the two airfoil profiles are fitted into the frame.

3. An auxiliary power unit according to claim 1, the actuator comprising a two-position actuator having a retracted position and an extended position, and being suitable for establishing a selected one of three operational modes including:

1) a first mode with the air intake foldable double door closed, where the actuator is in the retracted position, the frame is closed, and the two airfoil profiles are closed relative to the frame;

2) a second mode with the air intake foldable double door open, where the actuator is in the extended position, the frame is open, and the two airfoil profiles are open relative to the frame;

3) a third mode with the air intake foldable double door open, where the actuator is in the extended position, the frame is open, the two airfoil profiles are closed relative to the frame.

* * * * *